Sept. 6, 1966 W. E. PROEBSTER 3,271,751

MAGNETIC THIN FILM TRANSDUCER

Filed Dec. 3, 1962

INVENTOR.
WALTER E. PROEBSTER
BY Frank C. Chaderjian
ATTORNEY

United States Patent Office 3,271,751 Patented Sept. 6, 1966

3,271,751
MAGNETIC THIN FILM TRANSDUCER

Walter E. Proebster, Chappaqua, N.Y., assignor to International Business Machines Corporation, New York, N.Y., a corporation of New York Filed Dec. 3, 1962, Ser. No. 241,655
Claims priority, application Switzerland, Dec. 21, 1961, 14,928/61
9 Claims. (Cl. 340—174.1)

This invention relates to magnetic transducers and, more particularly, to improved magnetic transducers employing anisotropic thin magnetic films.

Heretofore, magnetic transducers employing bulk ferrite material have been limited to a given range of information handling due to the limitations of mechanical driving mechanisms controlling the start-stop movement of a record carrier, such as a magnetic tape, and the physical dimensions of the transducers themselves along with switching speeds attainable. The amount of storage density achievable per unit length in a record carrier by a magnetic transducer, its resolution, is directly dependent upon the size of the air gap, the thickness of its pole shoes, and the switching speed of the magnetic material.

High resolution magnetic transducers are provided having very small air gaps, attendant reduction in the pole shoes and very high switching speeds by constructing transducers according to this invention. Briefly, a transducer is constructed by providing a planar, rectangular shaped, anisotropic thin magnetic film element having an easy axis of remanent flux orientation which is angularly displaced from a given edge thereof. The given edge of the film element is positioned in field coupling relationship to a planar movable record carrier, such that the plane of the film element is perpendicular to the plane of the record carrier. Information may be recorded in the record carrier by providing discrete areas of either positive or negative magnetization, or a given magnetization and a demagnetized state. This information is recorded by switching the magnetization of the thin film from one stable state to another along its easy axis to record oppositely oriented areas of magnetization, or the magnetization of the thin film may be rotated either positively away from its stable state to magnetize the record carrier by close stray field coupling and to rotate the magnetization negatively from its original stable state to provide very little stray field coupling and thus leave the record carrier demagnetized. The information is read out by allowing the magnetic stray field from the record carrier to rotate the magnetization of the thin film either positively or negatively, for the case of oppositely magnetized means, or to provide rotation and no rotation in the case of magnetized and demagnetized areas.

Accordingly, it is a prime object of this invention to provide improved magnetic transducer structures.

A further object of this invention is to provide an improved magnetic transducer structure employing an anisotropic magnetic thin film.

Still another object of this invention is to provide an improved magnetic transducer structure employing an anisotropic thin magnetic film capable of providing high resolution in combination with a movable record carrier.

The foregoing and other objects, features and advantages of the invention will be apparent from the following more particular description of preferred embodiments of the invention, as illustrated in the accompanying drawings.

In the drawings:

FIG. 1 is a perspective view of one embodiment of a magnetic transducer according to this invention;

FIGS. 2*a* and 2*b* represent a diagrammatic representation of a thin film and its magnetization states as employed in the structure of FIG. 1;

Figure 1:
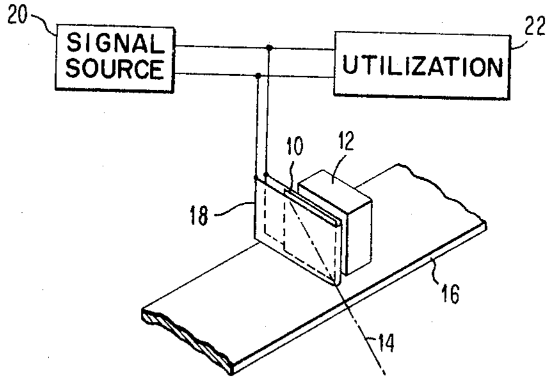
Figure 2:
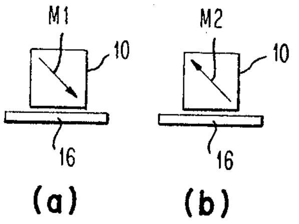

Referring to FIGS. 1, 2*a* and 2*b*, a transducer according to one embodiment of this invention is shown wherein a thin magnetic film 10 is made of magnetizable material exhibiting uniaxial anisotropy which is deposited on a substrate 12. The substrate 12 may be of rectangular shape as shown in the plan view of FIG. 1 and may consist of glass, or of metal, such as silver or the like. The film 10 may be provided by depositing, by vacuum evaporation, a soft magnetic Ni-Fe alloy (80% Ni and 20% Fe), to a thickness of the order of one tenth of one nanometer (1 nm.$=10^{-9}$ m.) on the substrate 12. During the deposition of the film, an uniaxial anisotropy is produced by use of an orienting magnetic field so that an easy axis of magnetization 14 is provided which forms an acute angle of preferably 45° with one of the lateral edges of the film. The film 10 has two stable states of remanent flux orientation, M1 and M2 as shown in FIGS. 2*a* and 2*b*, respectively. The first indicated stable direction of magnetization M1, shown in FIG. 2*a*, generates a positive magnetic stray field with respect to a strip-shaped magnetic record carrier 16 extending orthogonally to the plane of the film, while the other stable magnetization state M2, shown in FIG. 2*b*, generates a negative magnetic stray field with respect to the magnetic record carrier 16. The record carrier 16 is brought into very close mechanical contact, such as wiping contact with the transducer, in order to obtain an utmost concentration of the stray field emanating from the magnetic film 10. It follows that the effective pole shoe spacing in case of the present transducer is only determined by the thickness of the magnetic film 10.

For changing the direction of magnetization, i.e., for switching the magnetization of the film 10 from one into the other of the two stable states, a strip-shaped electric conductor 18 is provided, which extends parallel to the plane of the film 10 and surrounds the latter in a loop along both sides as close as possible. The electric conductor 18 may also be formed in layers and may be provided by vapor deposition of thin copper films. The sequence of films 18–10–18 deposited on the substrate 12 suitably is produced free of any air gap. It is obvious that for purposes of electric isolation between the films 10 and 18, intermediate insulating layers are provided, the indication of which in the figures has been omitted. The lateral edge of the film 10 is surrounded by the stripline 18 and the fold of this strip extends at right angles to the record medium 16. Two terminals of the electric stripline 18 are connected with a signal source 20 and utilization means 22 for signal recording in the record medium 16 and for reading out the signals recorded in medium 16, respectively. To record information in the member 16, it may be seen that a current flowing through the conductor 18 produces a magnetic field acting upon the thin magnetic film 10. The direction of the field thus produced forms an angle of about 45° with the easy axis 14 of the film. By means of the magnetic field generated by electric signals in the conductor 18, it is possible to effect a reversal of the magnetization M in the film 10 through 180° by coherent rotational switching. The coherent switching operation of the film 10 is further described in detail in a copending application, Serial No. 830,114, now U.S. Patent No. 3,123,717, filed in behalf of J. G. Hewitt et al., and assigned to the assignee of this application.

The recording of digital information on the magnetic record carrier 16 is effected in such a manner that the record carrier 16 simply is moved, e.g., in wiping contact, past the described magnetic transducer. Depending on the position of the magnetization vector M (cf. FIGS. 2*a* and 2*b*), either a positive or a negative magnetic stray field will be produced, as described above, by the thin magnetic film 10 with respect to the record carrier 16. This stray field from element 10 then magnetizes the record carrier as it is moved past the transducer in the positive or in the negative sense. The digital information thus is stored on the record carrier 16 in form of positive or negative magnetization. The binary value 1 shall, for example, be characterized by a positive magnetization and the binary value 0 by a negative magnetization of the record carrier.

Various modes of operation for the recording of digital information exist for the described transducer. In a first mode of operation, consider the initial or inoperative condition of the transducer wherein the magnetization vector M is in the 1 state, M1, so that a positive stray field exists from the film 10 with respect to the record carrier 16, as shown in FIG. 2*a*. Thus, when no current flows through the electric conductor 18, then the binary information 1 is written on the record carrier by the transducer. When it is desired to write a 0, first a negative current pulse is applied to the electric conductor 18 by signal means 20 which pulse reverses the magnetization vector through 180° into the opposite stable position M2, as shown in FIG. 2*b*. The negative stray field provided from film 10 when in the 0 stable state causes a negative magnetization of the moved record carrier 16 so that a 0 is written. In order to reset the transducer to the initial or inoperative condition again after the 0 has been recorded, the signal means 20 is operative to transmit a positive current pulse through the electric conductor 18 which resets the magnetization vector M from the 0 position M2 into the 1 position M1. From now on, the binary information 1 is again written on the record carrier by the transducer. The cycle may then start anew.

Still another recording method is one in which demagnetization of the carrier member 16 is employed. That is, the record carrier 16 which is fed to the transducer shall be demagnetized in that it shall not exhibit any distinct positive or negative magnetization. This demagnetized condition may be brought about, for example, by passing the record carrier 16 through a magnetic, preferably high-frequency alternating field which causes the demagnetization. Assume, the initial or inoperative condition of the transducer to be the 1 stable state M1, shown in FIG. 2*a*. When the record carrier 16 passes by the transducer which is in this initial state, it receives a certain positive magnetization which in this mode of operation may be considered negligible. When a positive current representing a 1 and having an amplitude of any size is transmitted from source 20 through the conductor loop 18, the magnetization vector M is downwardly deflected in clockwise direction by the magnetic signal field produced between the conductor loop. Rotation of the magnetization M of element 10 increases the magnitude of the stray field acting from the thin magnetic film 10 upon the record carrier 16 and provides an increase in the permeability of the magnetic film with respect to the signal field. Consequently, the film 10 exhibits a substantially denser magnetic pole induction (positive poles) on its bottom side, facing the record carrier 16, causing a substantially stronger positive magnetization of the record carrier 16.

When a 0 is to be recorded, a negative current is then transmitted from the signal input means 20 through the conductor loop 18 of such magnitude that the magnetic field produced thereby causes a deflection of the magnetization vector M in counterclockwise direction to approximately a horizontal position, i.e., a position extending parallel to the record carrier 16. In this position, no magnetic stray field from the film 10 is provided with respect to the record carrier 16, so that when the carrier 16 is moved past the transducer, the record member 16 essentially remains demagnetized. When the magnetization vector M is in the horizontal position, the permeability of the magnetic film 10 with respect to the signal field produced by energization of conductor 18 is comparatively low, so that in this case the magnetic pole induction (negative poles) on the bottom side of the transducer, facing the record carrier 16, is relatively small. When the positive or negative current which represents the binary information 1 or 0, respectively, is switched off, the magnetization vector M returns to its original initial or inoperative state M1 shown in FIG. 2*a*. It shall be pointed out that in this last-described method of recording a complete magnetic reversal of the magnetization vector through 180° into the opposite position M2 is not carried out, but in recording the binary information, the magnetization vector M is solely deflected from its inoperative position M1 downwardly or horizontally to the right hand through a predetermined angle (e.g., approximately 45°) either in clockwise direction (1) or in counterclockwise direction (0). As already mentioned, in case of downward deflection the amplitude of the signal current from source 20 may be of any magnitude, since the magnetization vector M after the signal current has been interrupted, switches back to the original inoperative position. When a deflection of the magnetization M into the horizontal position towards the right occurs, the signal current from source 20 must be suitably proportioned with respect to its amplitude, i.e., it must not be too great, so that upon termination the magnetization vector returns again to its original state M1.

A further embodiment of the method of recording binary information somewhat similar to the latter described embodiment may be utilized wherein for both binary values 1 and 0 the signal current amplitudes from source 20 are not strictly proportioned and may be of similar magnitude. For recording a 1, the magnetization vector M is caused to be deflected downward, as before, whereby a strong positive magnetic pole induction occurs on the surface of the transducer facing the record carrier. For recoding a 0, the magnetization vector M is caused to rotate into an upward direction, in which case a similar strong negative magnetic pole induction results on the side of the transducer facing the record carrier 16. In this method, the magnetization vector M, after each writing of a 1, is situated in the position M1 shown in FIG. 2*a* and, after a 0 has been written, it assumes the position M2 indicated in FIG. 2*b*.

To read out the information stored on the record medium 16 in magnetic form, the utilization means 22 is made operative and the record carrier 16 is moved past the transducer. The positive or negative magnetization condition of the record medium 16 then influences the magnetization vector M of the thin film 10 of the transducer by the magnetic stray field emanating from the record carrier 16. Depending upon whether a positive or a negative magnetization stray field is involved, the magnetization vector M is deflected by rotational switching either in clockwise direction or in counterclockwise direction. Since, as mentioned, rotational switching processes proceed very rapidly and practically without any loss of time, the transducer is able to react with sufficient resolving power and with respect to very rapidly succeeding changes in magnetization, which occur in the record carrier, meaning that the transducer is still extremely selective even at its limiting speed of response. As a result of the deflection of the magnetization vector M produced by the magnetization stray field of the record carrier 16, a corresponding readout voltage is induced in electric conductor 18 which is transmitted to the utilization means 22.

Figure 3:
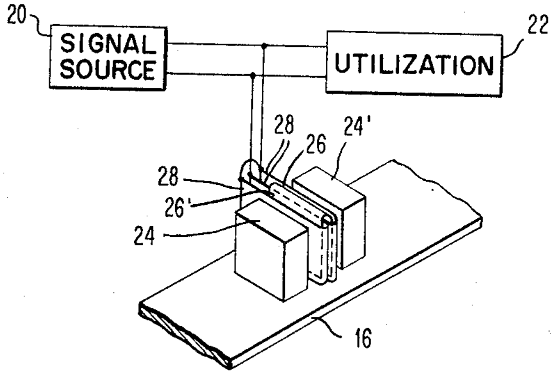
FIG. 3 illustrates a second embodiment of this invention.
Figure 4:
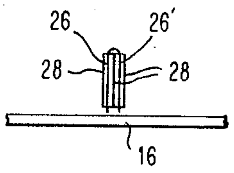
FIG. 4 is a cross-section of the embodiment of FIG. 3.

Referring to FIGS. 3 and 4, other embodiments of this invention are shown. In FIGS. 3 and 4, the lateral surfaces, facing each other, of two substrates 24 and 24′ each of which carry a thin film 26 and 26′, respectively, made of magnetizable material having an uniaxial anisotropy. An easy axis of magnetization 28 extends in both films 26 and 26′ parallel to each other so as to form an acute angle of preferably 45° with one of the lateral edges of the films. The magnetization vectors M and M′ in both films 26 and 26′, respectively, are in an antiparallel position with respect to each other, i.e., in the inoperative condition the magnetization vector M of one of the two films 26 points to the right-hand lower corner similar to M1 in FIG. 2*a*, while the magnetization vector M′ of the other film 26′ points to the left-hand upper corner similar to M2 in FIG. 2*b*. The two thin magnetic films 26 and 26′ are connected to each other at the side remote of the common magnetic record carrier 16, so that the magnetic flux is closed at that point. The two films 26 are enclosed on both sides by a W-shaped electric stripline 28, the film sequence 28–26–28–26′–28 applied to the substrate 24 being again established without any gap. Electrically insulating intermediate films which are not explicitly mentioned, must be thought to exist between the films 26 and the stripline 28. The lateral edges of the two films 26 which are surrounded by the W-shaped stripline 28, e.g., the two folds of the stripline 28 are situated at right angles to the record carrier 16. The middle branch of the stripline 28 is adapted for connection to one pole and the two outer conductor branches are adapted for connection to the other pole of signal source 20 and utilization means 22. This transducer which is otherwise formed similar to the embodiment shown in FIG. 1, provides a still better concentration of the magnetic flux with respect to the record carrier 16, which fact results in an energetically more favorable signal utilization on recording and also on reading information.

The mode of operation for write-in or readout digital information in case of the transducer according to FIGS. 3 and 4 is in principle the same as that described for the embodiment of FIG. 1. The most essential difference between the embodiments is that in the transducer of FIG. 1 the magnetic flux which emanates from the thin magnetic film 10 is closed through air in a comparatively scattered manner, while in the transducer of FIGS. 3 and 4 the magnetic flux circuit is completed in a short course similar to the circuit of a horseshoe magnet and substantially through the magnetic record carrier 16.

The described transducers can be built so as to be of very small size and of utmost compact construction. The power requirement of the transducers according to the invention is very low, while their operating speed is considerably higher than of known transducers.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In combination with a movable record member having a magnetizable surface, a transducer comprising, a plane anisotropic thin magnetic film element having an easy axis of remanent flux orientation defining opposite stable states, said film having at least one edge in close proximity to the surface of said record member with the easy axis being angularly displaced from said one edge, and a control winding coupling said film.

2. The combination of claim 1, wherein said film has a single plane and is positioned with the plane of the film perpendicular to the surface of said record member.

3. The combination of claim 2, wherein the easy axis of said film is displaced 45° with respect to said one edge.

4. The combination of claim 1, wherein said transducer is operable to provide a magnetized and a nonmagnetized area in said record member comprising, means energizing said control winding for rotating the magnetization of said film away from an original stable state along the easy axis in a selective one direction to provide a high intensity magnetic stray field coupling to said record carrier and in an opposite direction to provide negligible stray field coupling to said record carrier.

5. The combination as set forth in claim 1, including means for energizing said control winding with opposite polarity impulses to provide an area of magnetization and a non-magnetized area in said record member.

6. In combination with a movable record member having a magnetizable surface, a transducer comprising, an anisotropic thin magnetic film having an easy axis of remanent flux orientation defining opposite stable states;

said film being U-shaped with two edges thereof being in flux linkage with the surface of said record member and the easy axis thereof being angularly displaced from both said edges; and current conductive means coupling said film.

7. The combination of claim 6, wherein said easy axis is displaced approximately 45° with respect to said edges and said current conductive means is adapted to apply a field in the plane of said film displaced 45° with respect to the easy axis thereof when energized.

8. The combination of claim 7, including further means for energizing said current conductive means with opposite polarity impulses of similar magnitude and switch the magnetization thereof from one to another stable state.

9. In combination with a movable record member having a magnetizable surface, a transducer comprising, a magnetic circuit having a gap for flux interlinkage with said record member made of anisotropic magnetic thin film material having an easy axis of remanent flux orientation;

a control winding coupling said circuit; and means for selectively providing a magnetized and a non-magnetized area in said record member comprising, means for energizing said control winding with opposite polarity impulses.

No references cited.

BERNARD KONICK, *Primary Examiner.*

A. NEUSTADT, *Assistant Examiner.*